United States Patent
Tal

(10) Patent No.: US 8,976,904 B2
(45) Date of Patent: Mar. 10, 2015

(54) AUTOMATED ERASURE SLICER THRESHOLD CONTROL AND MODIFICATION OF SYMBOL ESTIMATES TO BE ERASED

(71) Applicant: Intel Corporation, Santa Clara, CA (US)

(72) Inventor: Noam Tal, Givataim (IL)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 13/631,229

(22) Filed: Sep. 28, 2012

(65) Prior Publication Data
US 2014/0092948 A1    Apr. 3, 2014

(51) Int. Cl.
H04L 27/38    (2006.01)

(52) U.S. Cl.
USPC .......................... 375/332; 375/233; 375/340

(58) Field of Classification Search
CPC ... H04L 27/01; H04L 27/38; H04L 25/03019; H04L 25/06; H04L 25/067; H04L 1/20; H04B 17/00
USPC .......................... 375/233, 261, 317, 332, 340
See application file for complete search history.

(56) References Cited

U.S. PATENT DOCUMENTS

| | | | | |
|---|---|---|---|---|
| 4,283,682 | A * | 8/1981 | Sifford et al. | 375/327 |
| 5,323,424 | A * | 6/1994 | Fazel et al. | 375/329 |
| 6,898,239 | B2 * | 5/2005 | Singvall | 375/233 |
| 2003/0139165 | A1 | 7/2003 | Smith et al. | |
| 2003/0179768 | A1 | 9/2003 | Lusky et al. | |
| 2004/0088611 | A1 * | 5/2004 | Peeters et al. | 714/704 |
| 2005/0278609 | A1 * | 12/2005 | Kim et al. | 714/780 |
| 2010/0166115 | A1 | 7/2010 | Hewavithana et al. | |
| 2011/0041041 | A1 | 2/2011 | Kim | |
| 2011/0151884 | A1 * | 6/2011 | Zhao | 455/452.1 |
| 2011/0299447 | A1 | 12/2011 | Rudolf et al. | |

FOREIGN PATENT DOCUMENTS

WO    2014051766 A1    4/2014

OTHER PUBLICATIONS

Marco Chiani, "Introducing Erasures in Decision-Feedback Equalization to Reduce Error Propagation," Jul. 1997, IEEE Transactions on Communications, vol. 45, No. 7, pp. 757-760.*
International Search Report and Written Opinion received for Patent Application No. PCT/US2013/047342, mailed on Oct. 18, 2013, 10 Pages.

* cited by examiner

*Primary Examiner* — Betsy Deppe
(74) *Attorney, Agent, or Firm* — Garrett IP, LLC

(57) ABSTRACT

Methods and systems to vary an erasure slicer threshold based on a measure computed from prior soft and/or hard symbol decisions, identify reliable symbol estimates based on the threshold, identify unreliable symbol estimates for erasure based on the threshold, modify the identified symbol estimates, output the reliable symbol estimates and the modified symbol estimates as erasure slicer decisions, and filter the decisions in a feedback filter of a decision feedback equalizer (DFE). The erasure slicer threshold may be based on signal-to-noise ratio (SNR) or mean-squared-error (MSE). A symbol estimate may be identified for erasure when a coordinate of the corresponding soft decision is within an erasure area defined by the threshold. Symbol modification may include replacing a corresponding coordinate of the symbol estimate with a coordinate of a decision boundary associated with the erasure area.

28 Claims, 11 Drawing Sheets

AUTOMATED ERASURE SLICER THRESHOLD CONTROL AND MODIFICATION OF SYMBOL ESTIMATES TO BE ERASED

BACKGROUND

A conventional decision feedback equalizer (DFE) uses prior symbol decisions (i.e., hard decisions) to remove inter-symbol interference (ISI) from future symbols. A DFE includes a linear feed forward filter to filter samples and a linear feedback filter to weight hard decisions of prior symbols. The weighted hard decisions are subtracted from the output of the feed forward filter to provide equalized samples or soft decisions. Tap weights of the feed forward and feedback filters may be controlled to reduce error between the soft and hard decisions.

Erroneous hard decisions propagate through the DFE feedback filter to corrupt future symbols. A DFE may include an erasure slicer to mitigate such error propagation by avoiding feedback of unreliable (i.e., potentially erroneous) hard decisions, referred to as "erasing." A hard decision may be identified for erasure when a corresponding soft decision is within a threshold distance of a decision boundary. The threshold may be referred to as an erasure threshold or an erasure slicer threshold.

The erasure threshold may impact DFE performance. If the threshold is too high, reliable hard decisions may be unnecessarily erased. If the threshold is too low, unreliable hard decisions may propagate errors to future symbols.

Multi-dimensional erasure threshold optimization techniques have been proposed, but are not practical for cost-sensitive, real-time applications.

Figure 1:
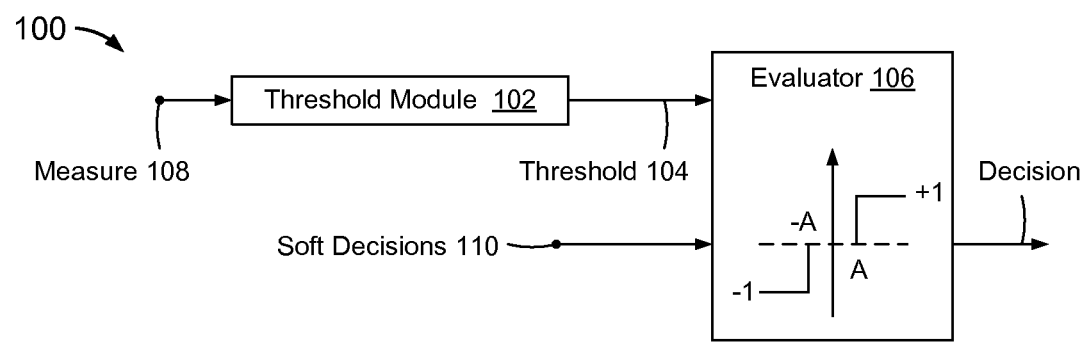
FIG. 1 is a block diagram of a system that includes an evaluator to evaluate soft decisions based on a threshold, and a threshold module to vary the threshold based on a measure of prior soft and/or hard symbol decisions.

In the drawings, the leftmost digit(s) of a reference number identifies the drawing in which the reference number first appears.

DETAILED DESCRIPTION

FIG. 1 is a block diagram of a system 100, including an evaluator 106 to evaluate soft decisions 110 based on a threshold 104, and a threshold module 102 to vary threshold 104 based on a measure 108. Soft decisions 110 may correspond to symbols of a quadrature amplitude modulated (QAM).

Evaluator 106 may be configured to determine whether a symbol estimate for a soft decision 110 is reliable based on proximity of the soft decision 110 to a decision boundary between adjacent points of a QAM constellation. Evaluator 106 may be configured to identify the symbol estimate for erasure when the corresponding soft decision 110 is within a distance from the decision boundary defined by threshold 104, such as described further below with reference to FIGS. 4 and 5. Evaluator 106 may be further configured to modify a soft decision that is identified for erasure, such as described further below with reference to FIGS. 4 and 5.

Measure 108 may include an error measure and/or a noise measure, which may be computed from prior soft and/or hard symbol decisions, such as described further below with reference to FIGS. 7, 8, and/or 9. Measure 108 may be referred to herein as a "priors" measure when computed from prior decisions.

Evaluator 106 may be implemented as an erasure slicer of a decision feedback equalizer (DFE), such as described below with reference to FIG. 2.

Figure 2:
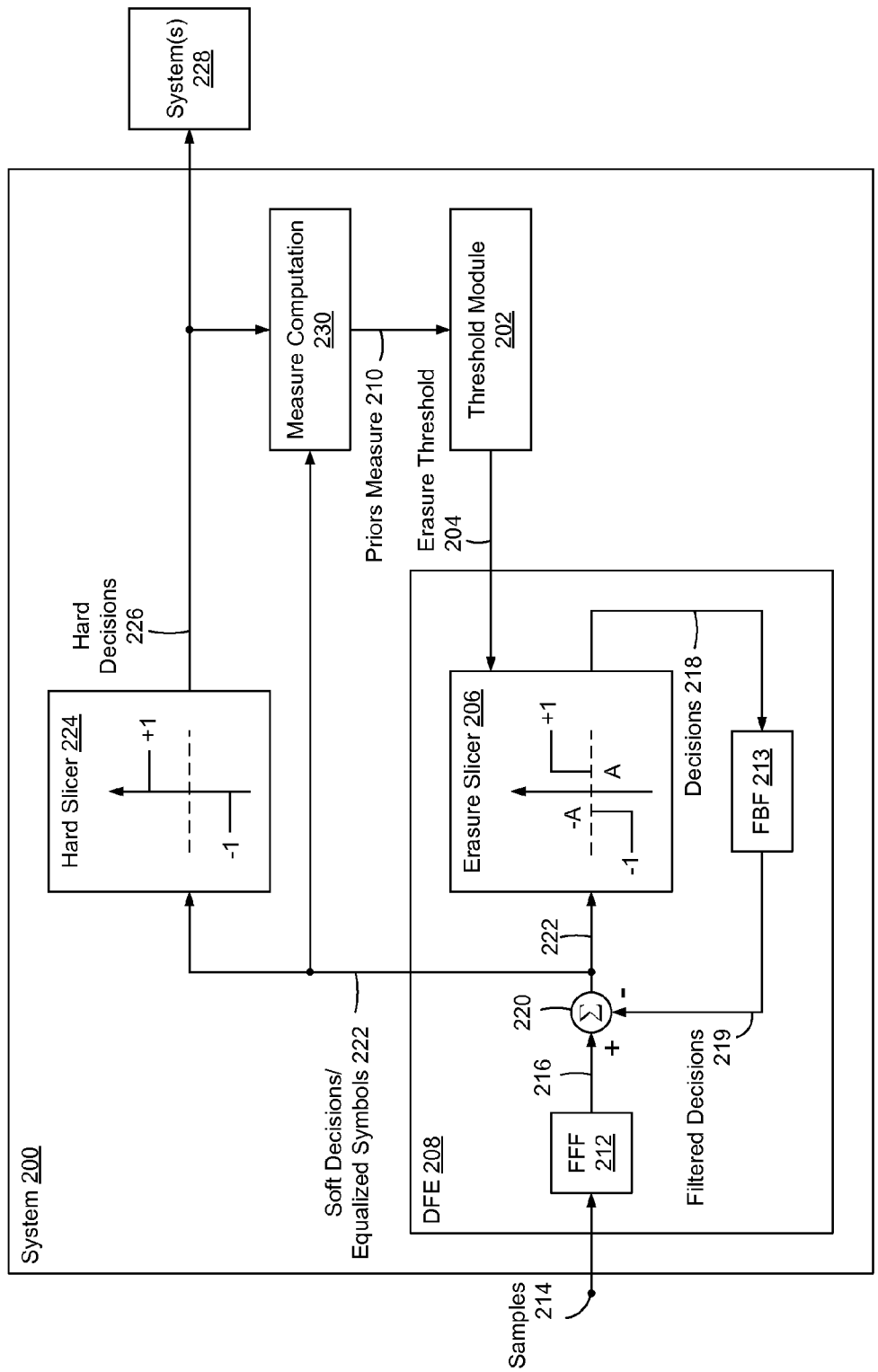
FIG. 2 is a block diagram of a demodulator, including a decision feedback equalizer (DFE) to generate soft decisions from samples of a QAM signal, an erasure slicer, and a threshold module to vary an erasure threshold based on the measure of prior soft and/or hard symbol decisions.

FIG. 2 is a block diagram of a system 200, including a DFE 208 to generate soft decisions 222 from samples 214 of a QAM signal. System 200 may represent a demodulator of a receiver system.

DFE 208 includes a feed forward filter (FFF) 212 to provide preliminary or initial soft decisions 216, and a feedback filter (FBF) 213 to filter decisions 118 from an erasure slicer 206 and to provide corresponding filtered decisions or feedback 219. DFE 208 further includes a summation module or node 220 to remove or subtract feedback 219 from preliminary soft decisions 216 to generate soft decisions 222.

In FIG. 2, FBF 213 filters erasure slicer decisions 118, rather than a noise or error measure, such as MSE.

System 200 further includes a measure module 230 to compute a measure 210 based on prior hard decisions 226 and/or prior soft decisions 222. Measure 210 may be referred to herein as a "priors" measure. Measure module 210 may be configured to compute measure 210 as a per-symbol measure and to update measure 210 for each symbol. Measure module 230 may be configured to compute measure 210 as a running average of per-symbol measures, over a sliding window of symbols. An example implementation of measure module 230 is provided further below with reference to FIG. 6.

System 200 further includes a threshold module 202 to compute an erasure threshold 204 based on measure 210, and to vary erasure threshold 204 based on variations in measure 210. Example implementations of threshold module 202 are provided further below with reference to FIGS. 7, 8, and 9.

System 200 further includes a detector, illustrated here as a hard slicer 224, to determine hard decisions 226 based on soft decisions 222. A hard decision 226 may be determined as a point of a QAM constellation based on proximity of the corresponding soft decision 222 to the point, such as described below with reference to FIGS. 4 and 5. Hard decisions 226 may be provided to measure module 230 and/or one or more other systems 228, such as a decoder.

System 200 further includes an erasure slicer 206 to evaluate soft decisions 222 based on erasure threshold 204 and points of a QAM constellation.

Erasure slicer 206 may be configured to estimate a symbol for a soft decision 222, similar to hard slicer 224.

Erasure slicer 206 may be further configured to provide the symbol estimate as a decision 118 when the soft decision 222 is sufficiently proximate to the constellation point as defined by threshold 204.

Erasure slicer 206 may be further configured to identify the symbol estimate for erasure when the soft decision 222 falls within an erasure area defined by threshold 204.

Erasure slicer 206 may be further configured to modify the symbol estimate identified for erasure, such as described below with reference to FIGS. 4 and 5, and to provide the modified symbol estimate as the decision 118.

Figure 3:
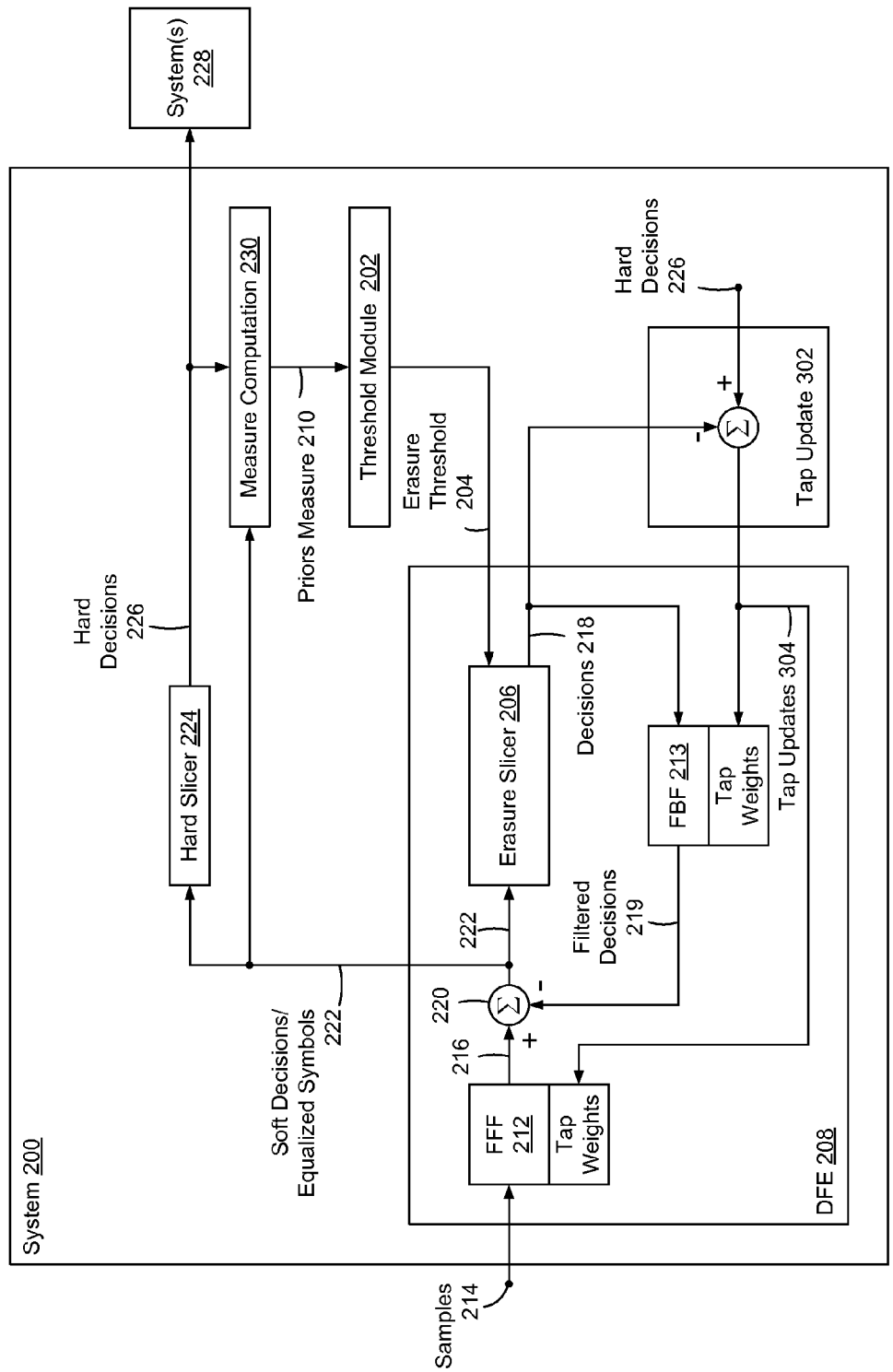
FIG. 3 is a block diagram of the demodulator of FIG. 2, further including a tap update module to update filter taps of the DFE.

FIG. 3 is a block diagram of system 200, further including a tap update module 302 to provide filter tap updates 304 to filter taps 306 and 308 of FFF 212 and FBF 213. In the example of FIG. 3, tap update module 302 determines tap updates 304 based on a combination of hard decisions 226 and erasure slicer decisions 218. Tap updates 304 may be used to update values in an adaptive filter delay line of FFF 212 and/or FBF 213.

Figure 4:
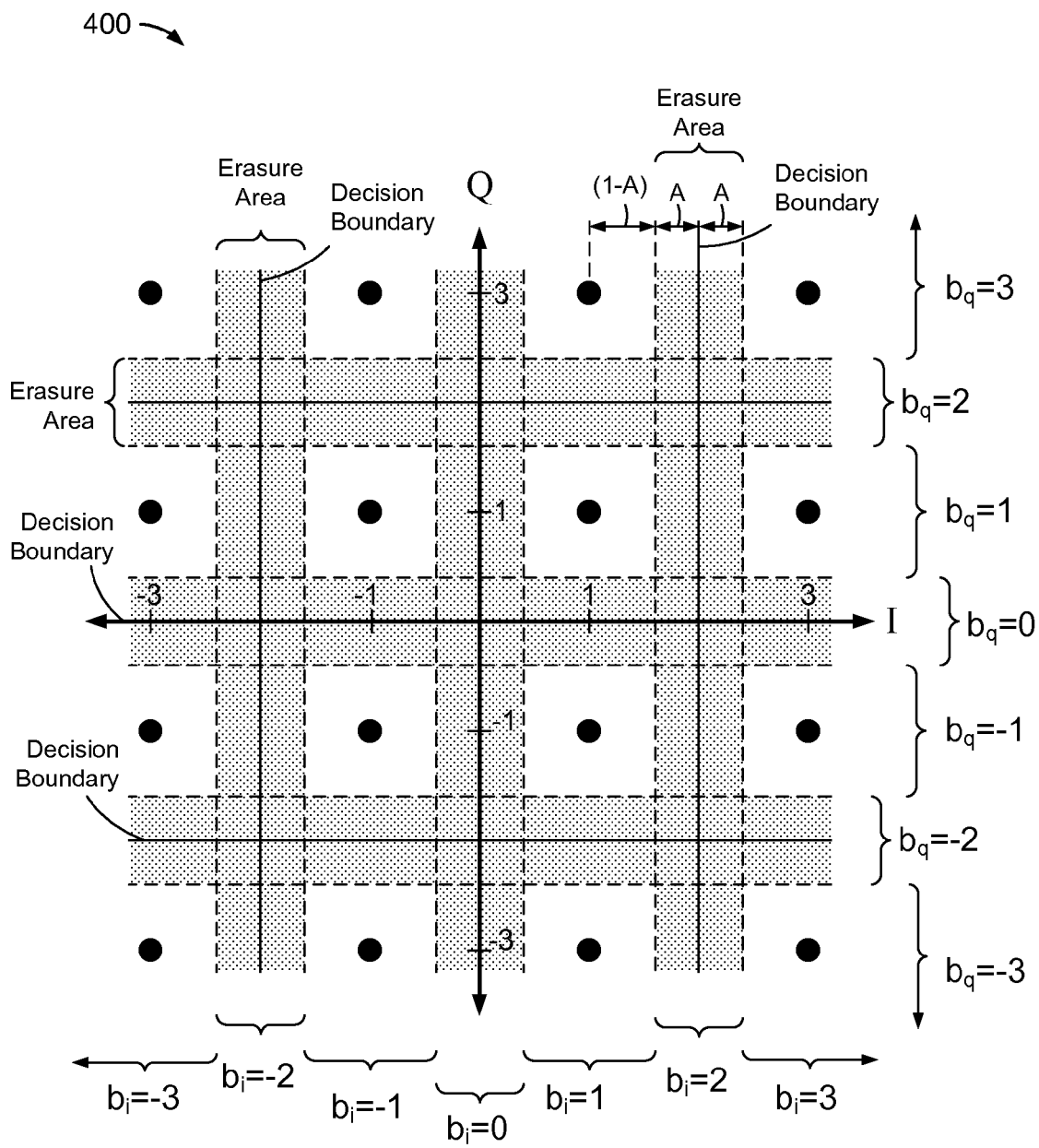
FIG. 4 is depiction of a 16-QAM constellation, including constellation points, decision boundaries, and erasure areas defined by an erasure threshold.

FIG. 4 is depiction of a 16-QAM constellation 400, including solid dots to illustrate constellation points, solid lines to illustrate decision boundaries between constellation points, hashed lines to illustrate a threshold range or distance "A" from the decision boundaries, and shading to illustrate erasure areas of the decision boundaries bounded by A. Threshold distance A may correspond to or be based on erasure threshold 104 in FIG. 1 and/or erasure threshold 204 in FIGS. 2 and 3.

Methods and systems disclosed herein are not limited to 16-QAM, and may be implemented with lower-order and/or higher-order QAM constellations.

In FIG. 4, coordinates are illustrated as $(b_i, b_q)$, where $b_i$ represents a position along an I axis, and $b_q$ represents a position along a Q axis. In the example of FIG. 4, constellation points have odd $b_1$ and $b_q$ coordinates, and decision boundaries have even $b_1$ or $b_q$ coordinates.

When a $b_i$ or a $b_q$ coordinate of a soft decision is within an erasure area, the soft decision is identified for erasure. A modified symbol estimate may be determined for the soft decision based on coordinates of a nearest coordinate point and a coordinate of a decision boundary within the erasure area, such as described below with reference to FIG. 5.

Figure 5:
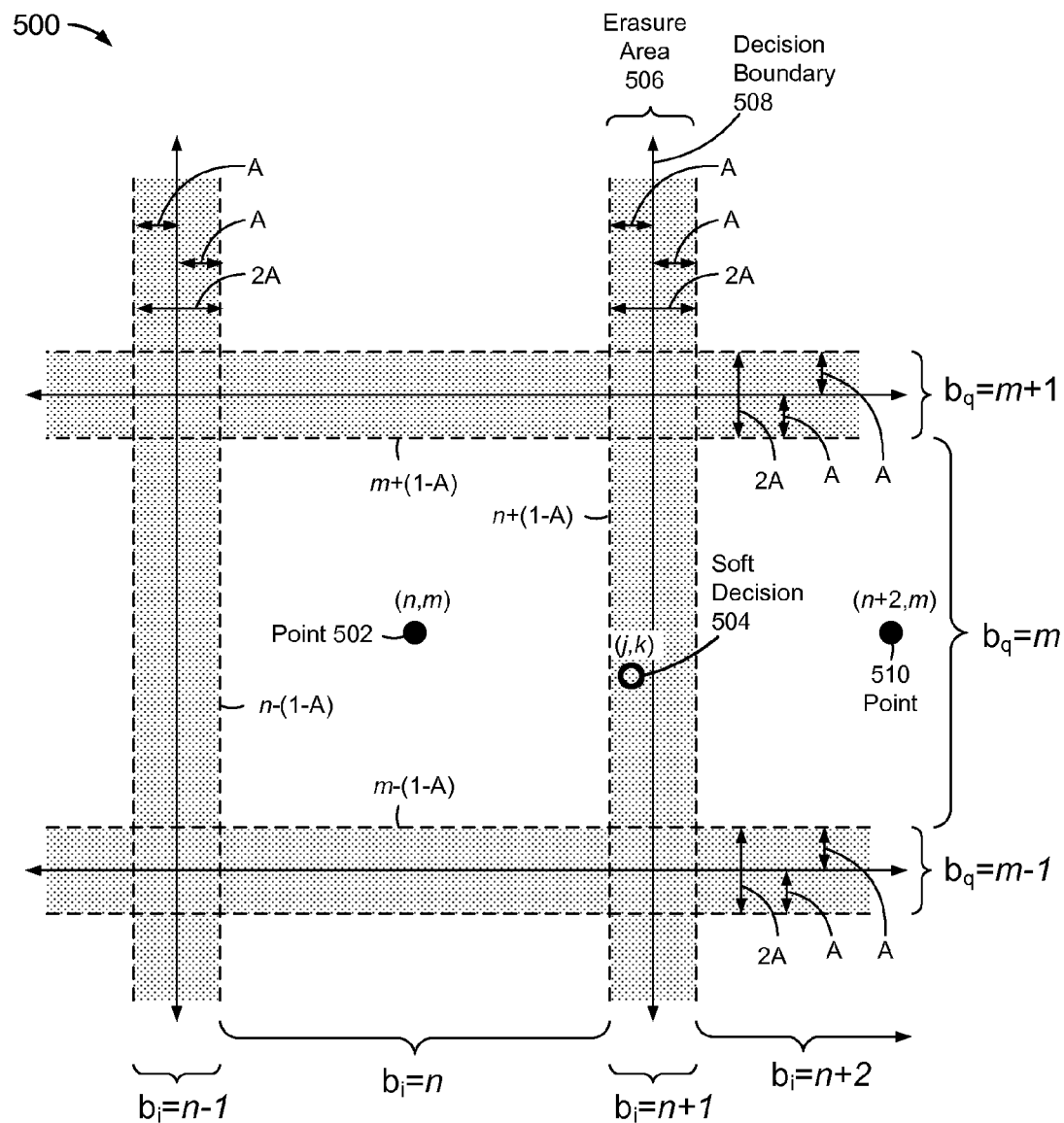
FIG. 5 is a depiction of a portion of a QAM constellation, including a soft decision within an erasure area.

FIG. 5 is a depiction of a portion of a QAM constellation 500, including a constellation point 502 having coordinates $b_i = n$ and $b_q = m$, and further including a soft decision 504 having coordinates $b_i = j$ and $b_q = k$.

Based on the illustrated position of soft decision 504, point 502 may be estimated as a symbol for soft decision 504. Soft decision 504 may, however, be identified for erasure since it falls within an erasure area 506 of a decision boundary 508.

Computationally, soft decision 504 may be identified for erasure if any of the following conditions is met:

$$j > n + (1-A);$$

$$j < n - (1-A);$$

$$k > m + (1-A); \text{ and}$$

$$k < m - (1-A).$$

Stated another way, soft decision 504 may be identified for erasure unless both of the following conditions are met:

$$n - (1-A) \le j \le n + (1-A); \text{ and}$$

$$m - (1-A) \le k \le m + (1-A).$$

In FIG. 5 it can be seen that $m-(1-)<k<m+(1-A)$. The $b_q$ coordinate of soft decision 504 thus does not trigger erasure.

It can also be seen that $j > n + (1-A)$. The $b_i$ coordinate of soft decision 504 thus triggers erasure.

In an embodiment, the $b_i$ coordinate of soft decision 504 is modified from j to the $b_i$ coordinate of decision boundary 508, illustrated here as n+1. In FIGS. 2 and 3, erasure slicer 206 may output decision 218 with coordinates $b_i = n+1$ and $b_q = m$.

Modification of a symbol estimate may mitigate error propagation through FFB 213 in FIG. 2. For example, if the correct symbol for soft decision 504 is point 510 at coordinates (n+2, m), an incorrect estimate of point 502 introduces an error of 2. Modification of soft decision 504 to coordinates (n=n+1, m), reduces the error to 1.

Conversely, if the correct symbol estimate for soft decision 504 is point 502, modification of soft decision 504 to coordinates (n=n+1, m) introduces an error of 1.

Erasure threshold A may thus impact performance of DFE 208. If threshold 204 is too low, unreliable decisions are propagated through FBF 213, at least some of which are erroneous and will introduce an error of 2. If threshold 204 is too high, estimated symbols may be unnecessarily modified and introduce errors of 1.

Simulations comparing symbol error rate (SER) and various erasure threshold values illustrate that minimum SER may be obtained with a relatively wide range of erasure threshold values. It has been determined that signal-to-noise ratio (SNR) and mean squared error (MSE) values fall within the range of erasure threshold values, and/or correlate to the range of erasure threshold values.

Measure module 230 may thus be configured to compute measure 210 as a SNR or a MSE between hard decisions 226 and soft decisions 222.

SNR is dependent on signal power, and may be constellation-dependent.

MSE may be analogous to a noise power, and is constellation-independent. MSE may thus permit threshold module 202 to compute erasure threshold 204 independent of a QAM constellation size. MSE may be computed from prior soft decisions without use of eraser slicer decisions 118.

Measure module 230 may be configured to compute MSE with a relatively slow (i.e., relatively large) memory, and may be configured to compute an infinite impulse response (IIR)-based MSE measurement.

Figure 6:
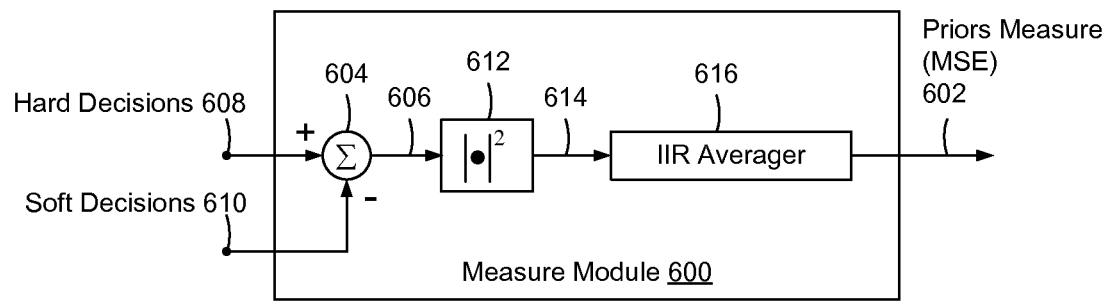
FIG. 6 is a block diagram of a measure module to determine a mean squared error (MSE) between hard and soft decisions.

FIG. 6 is a block diagram of a measure module 600 to determine a measure 602 as a MSE between hard decisions 608 and soft decisions 610.

Measure module 600 includes a summation module or node 604 to determine difference 606 between hard decisions 608 and corresponding soft decisions 610 of symbols.

Measure module 600 further includes a squaring module 612 to square absolute values of differences 606, to provide per-symbol measures 614.

Measure module 600 further includes an averager 616, illustrated here as an IIR averager, to maintain a running average of measures 614 over a sliding window of symbols.

Measure module 600 may represent an example implementation of measure module 230 in FIGS. 2 and 3.

Threshold module 202 may be configured to compute erasure threshold 204 as a weighted running average of SNR or MSE over a sliding window of symbols, such as described below with reference to FIG. 7 and/or FIG. 8. The weight may be configurable, such as described below with reference to FIG. 9.

Figure 7:
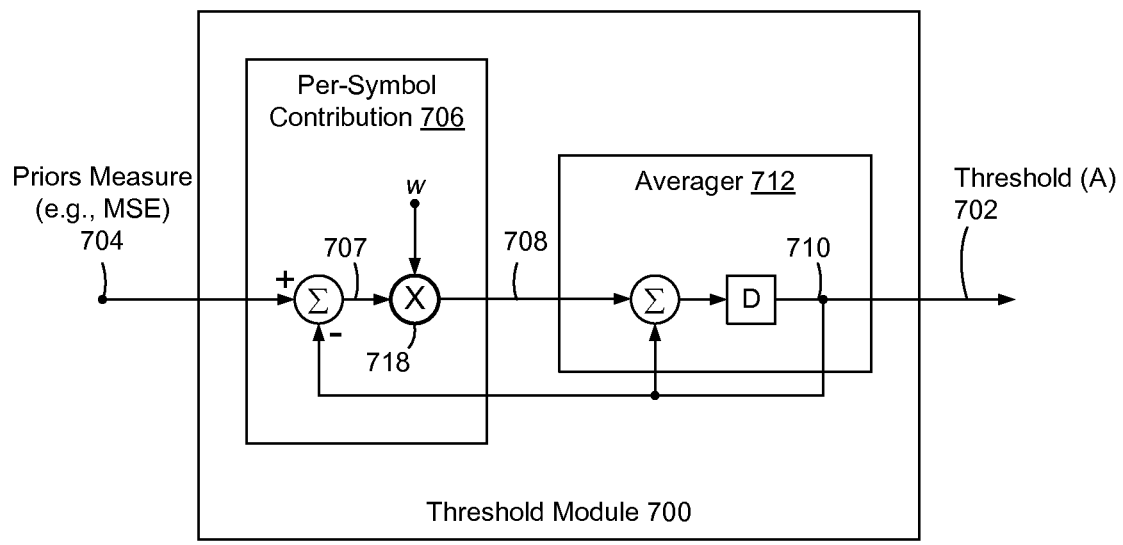
FIG. 7 is a block diagram of a threshold module to compute an erasure threshold based on a measure of prior soft and/or hard symbol decisions, and to vary the erasure threshold based on variations in the measure.

FIG. 7 is a block diagram of a threshold module 700 to compute an erasure threshold 702 based on a measure 704, and to vary erasure threshold 702 based on variations in measure 704. Measure 704 may represent SNR or MSE, such as measure 602 in FIG. 6.

Threshold module 700 may represent an example implementation of threshold module 102 in FIG. 1 and/or threshold module 202 in FIG. 2. Threshold module 700 may be implemented with or as an IIR averager.

In FIG. 7, threshold module 700 includes an averager 712 to compute a running average 710 of per-symbol contributions 708, over a sliding window of prior symbols, and to update running average 710 with a contribution 708 of a current symbol.

Threshold module 700 further includes a per-symbol contribution module 706 to compute per-symbol noise contributions 708 based on differences 707 between measure 704 and running average 710.

In FIG. 7, threshold module 700 is configured to provide running average 710 as threshold 702, which may correspond to threshold A in FIGS. 4 and 5. Alternatively, an erasure threshold may be provided as (1−A), such as described below with reference to FIG. 8.

Figure 8:
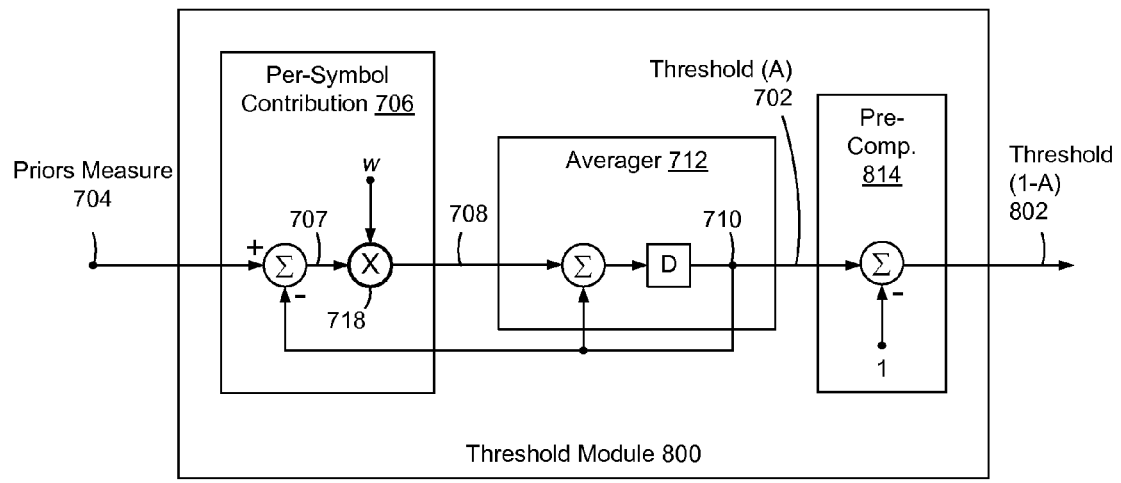
FIG. 8 is a block diagram of another threshold module, including features illustrated in FIG. 7, and further including a pre-compensation module to provide a modified erasure threshold to an erasure slicer.

FIG. 8 is a block diagram of a threshold module 800, including features described above with reference to FIG. 7, and further including a pre-compensation module 814 to subtract running average 710 (i.e., A), from 1, to provide an erasure threshold 802 of (1−A), which may be used by an erasure slicer as described above with reference to FIGS. 4 and 5. Providing a threshold of (1−) to an erasure slicer may simplify computations at the erasure slicer, and may minimize effect on a critical path timing within a DFE feedback loop.

In FIG. 7, contribution system 706 further includes a weighting module or node 718 to apply a weight w to differences 707. Weight w may be configurable, such as described below with reference to FIG. 9.

Figure 9:
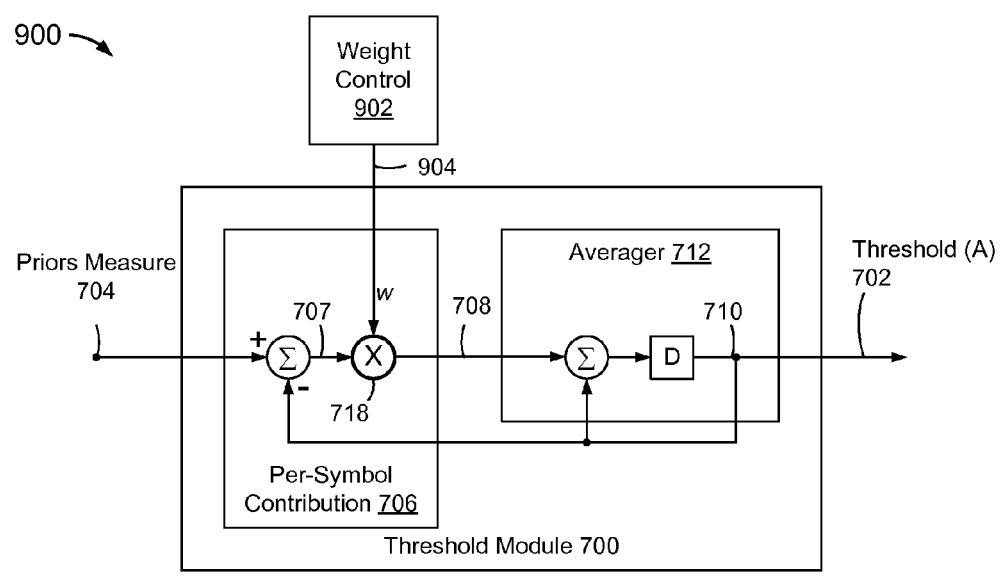
FIG. 9 is a block diagram of a configurable weight control module to provide a configurable weight to the threshold module of FIG. 7.

FIG. 9 is a block diagram of a system 900, including threshold module 700 and a configurable weight control module 902 to provide a configurable weight 904 to weighting module 718. A higher weight 904 may increase sensitivity of threshold 702 to higher-frequency variations in measure 704. A lower weight 904 may decrease sensitivity of threshold 702 to higher-frequency variations in measure 704.

Weight control module 902 may be configured to adjust weight 904 linearly or incrementally, and may be configured to provide weight 904 as one of multiple selectable values or steps. In an embodiment, weight control module is user-configurable to provide weight 904 as a selectable one of 2, 1, 0.5, and 0.25. Weight control module 902 is not, however, limited to this example.

Methods and systems disclosed herein may be implemented in circuitry, a computer system, or other machine, and combinations thereof, including discrete and integrated circuitry.

Figure 10:
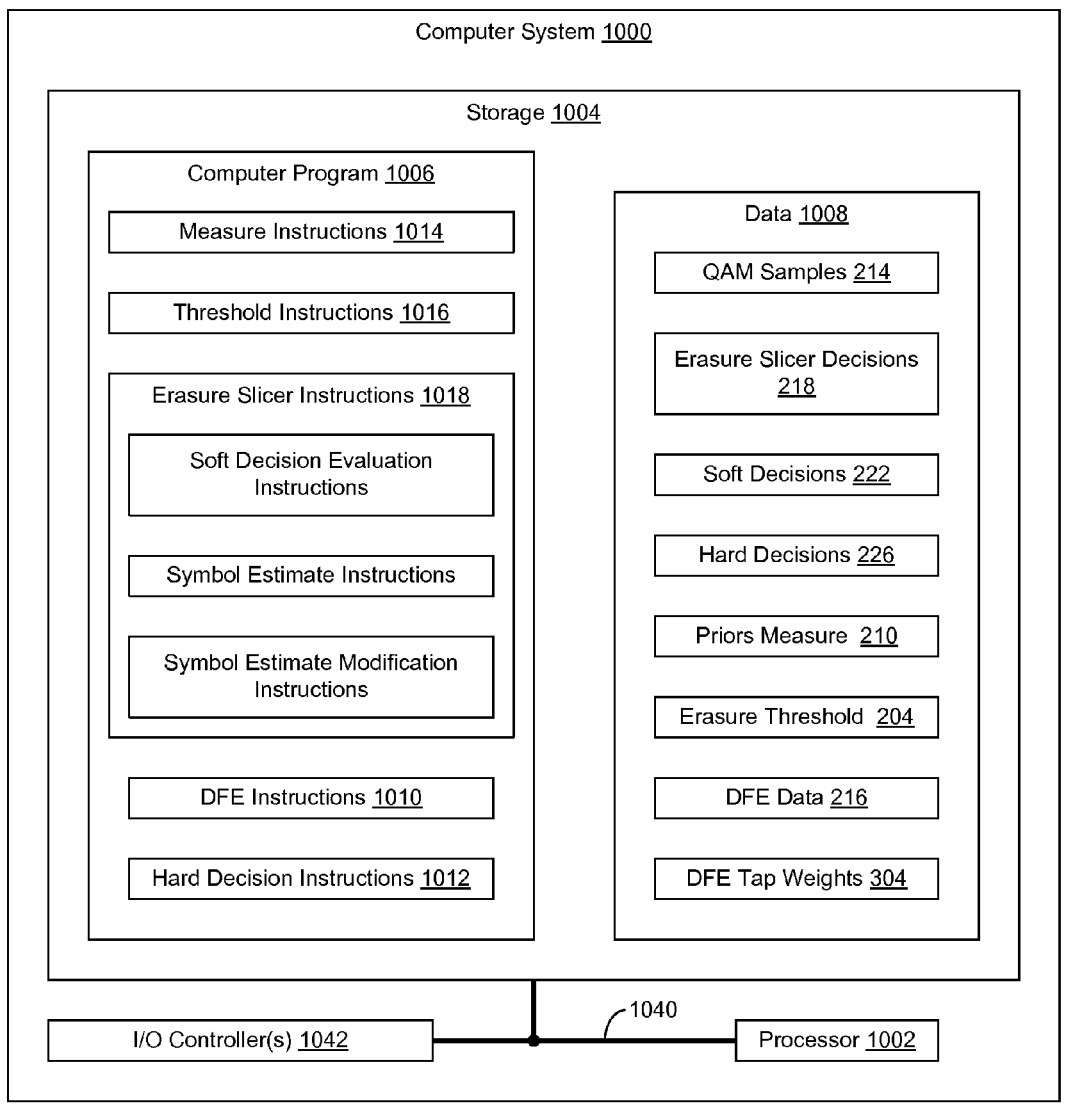
FIG. 10 is a block diagram of a computer system configured to provide erasure slicer threshold control and to modify symbol estimates identified for erasure.

FIG. 10 is a block diagram of a computer system 1000, configured to control an erasure slicer threshold, perform erasure slicing, and modify symbol estimates identified for erasure.

Computer system 1000 is described below with reference to FIG. 2. Computer system 1000 is not, however, limited to the example of FIG. 2.

Computer system 1000 includes one or more computer instruction processor units and/or processor cores, illustrated here as a processor 1002, to execute instructions of a computer program. Processor 1002 may include a general purpose instruction processor, a controller, a microcontroller, or other instruction-based processor. The computer program, also referred to as computer program logic, may be encoded within a computer readable medium, which may include a non-transitory medium.

Computer system 1000 further includes storage 1004, which may include one or more types of storage described below with reference to FIG. 11.

Figure 11:
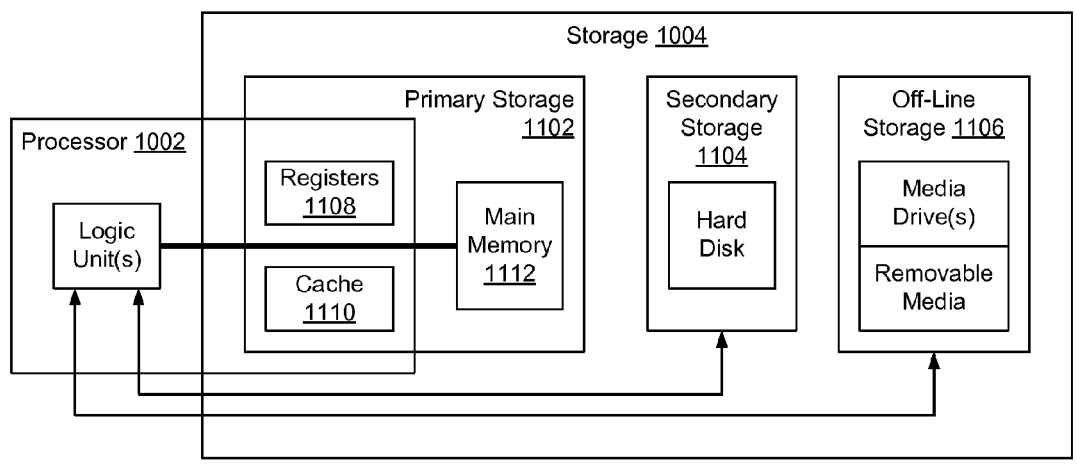
FIG. 11 is a block diagram of a processor and storage of FIG. 10, where the storage includes primary storage, secondary storage, and off-line storage.

FIG. 11 is a block diagram of processor 1002 and storage 1004, where storage 1004 includes primary storage 1102, secondary storage 1104, and off-line storage 1106.

Primary storage 1102 includes registers 1108, processor cache 1110, and main memory or system memory 1112. Registers 1108 and cache 1110 may be directly accessible by processor 1002. Main memory 1112 may be accessible to processor 1002 directly and/or indirectly through a memory bus. Primary storage 1102 may include volatile memory such as random-access memory (RAM) and variations thereof including, without limitation, static RAM (SRAM) and/or dynamic RAM (DRAM).

Secondary storage 1104 may be indirectly accessible to processor 1002 through an input/output (I/O) channel, and may include non-volatile memory such as read-only memory (ROM) and variations thereof including, without limitation, programmable ROM (PROM), erasable PROM (EPROM), and electrically erasable PROM (EEPROM). Non-volatile memory may also include non-volatile RAM (NVRAM) such as flash memory. Secondary storage 1104 may be configured as a mass storage device, such as a hard disk or hard drive, a flash memory drive, stick, or key, a floppy disk, and/or a zip drive.

Off-line storage 1106 may include a physical device driver and an associated removable storage medium, such as an optical disc.

In FIG. 10, storage 1004 includes data 1008 to be used by processor 1002 during execution of a computer program, and/or generated by processor 1002 during execution of a computer program.

Storage 1004 further includes a computer program 1006 to cause processor 1002 to process samples 214 of a QAM signal.

In the example of FIG. 10, computer program 1006 includes DFE instructions 1010 to cause processor 1002 to generate soft decisions 222 based on samples 214 of a QAM signal and erasure slicer decisions 218, such as described in one or more examples herein.

Computer program 1006 further includes hard decision instructions 1012 to cause processor 1002 to determine hard decisions 226 based on soft decisions 222, such as described in one or more examples herein.

Computer program 1006 further includes measure instructions 1014 to cause processor 1002 to compute measure 210, and threshold instructions 1016 to cause processor 1002 to compute erasure threshold 204 based on measure 210, such as described in one or more examples herein.

Computer program 1006 further includes erasure slicer instructions 1018 to cause processor 1002 to evaluate soft decisions 222 based on erasure threshold 204, and generate erasure slicer decisions 218, such as described in one or more examples herein.

Computer system 1000 may include communications infrastructure 1040 to communicate amongst devices and/or resources of computer system 1000.

Computer system 1000 may include one or more input/output (I/O) devices and/or controllers 1042 to communicate with one or more other systems.

Figure 12:
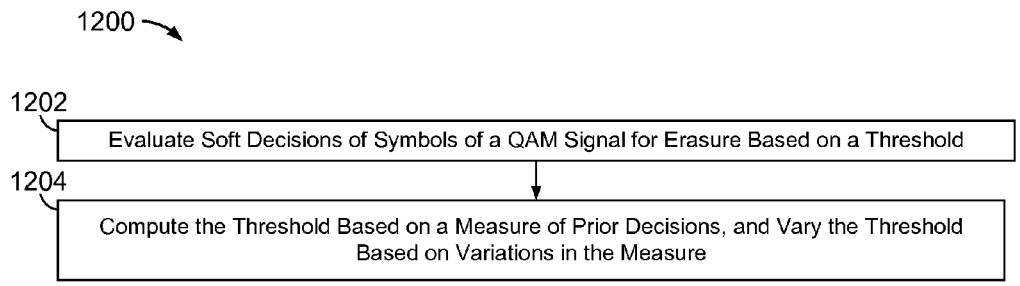
FIG. 12 is a flowchart of a method of erasure slicing with automated slicer threshold control.

FIG. 12 is a flowchart of a method 1200 of erasure slicing with automated slicer threshold control.

At 1202, a threshold is computed based on a measure computed from prior soft and/or hard symbol decisions, and is varied based on variations in the measure, such as described in one or more examples herein.

At 1204, soft decisions of QAM symbols are evaluated for erasure based on the threshold, such as described in one or more examples herein.

Figure 13:
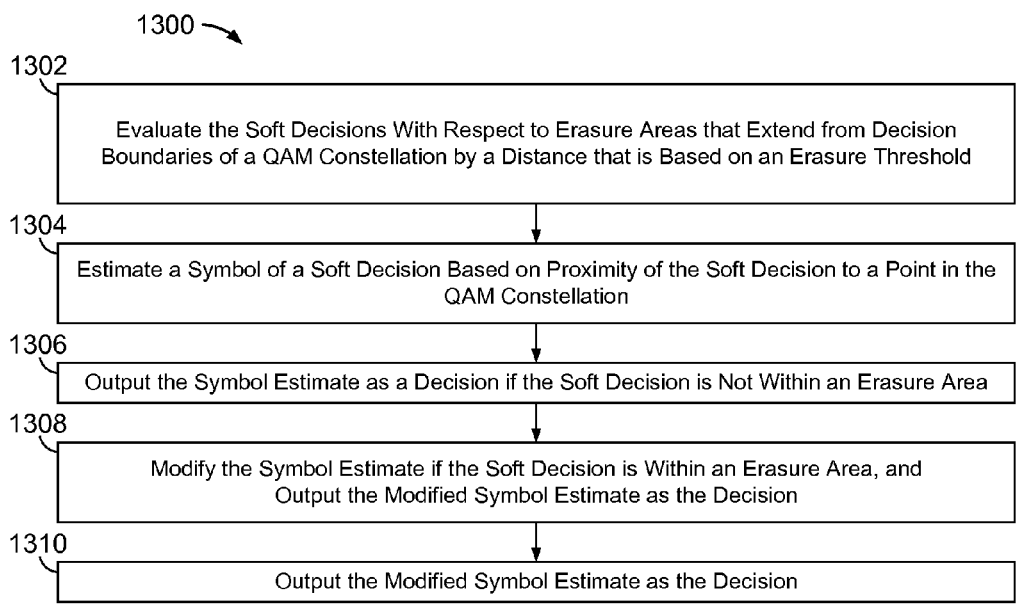
FIG. 13 is a flowchart of a method of identifying symbol estimates for erasure, and modifying symbol estimates identified for erasure.

FIG. 13 is a flowchart of a method 1300 of identifying symbol estimates for erasure, and modifying symbol estimates identified for erasure.

At 1302, soft decisions are evaluated with respect to erasure areas that extend from decision boundaries between adjacent points of a QAM constellation, by a distance that is based on an erasure threshold, such as described in one or more examples herein.

At 1304, a symbol estimate is generated for a soft decision based on proximity of the soft decision to a point in the QAM constellation, such as described in one or more examples herein.

At 1306, the symbol estimate is output as a decision if the soft decision is not within an erasure area, such as described in one or more examples herein.

At 1308, the symbol estimate is modified if the soft decision is within an erasure area, such as described in one or more examples herein.

At 1310, the modified symbol estimate is output as the decision.

Methods and systems disclosed herein may be implemented with respect to one or more of a variety of systems, such as described below with reference to FIG. 14. Methods and systems disclosed herein are not, however, limited to the examples of FIG. 14.

Figure 14:
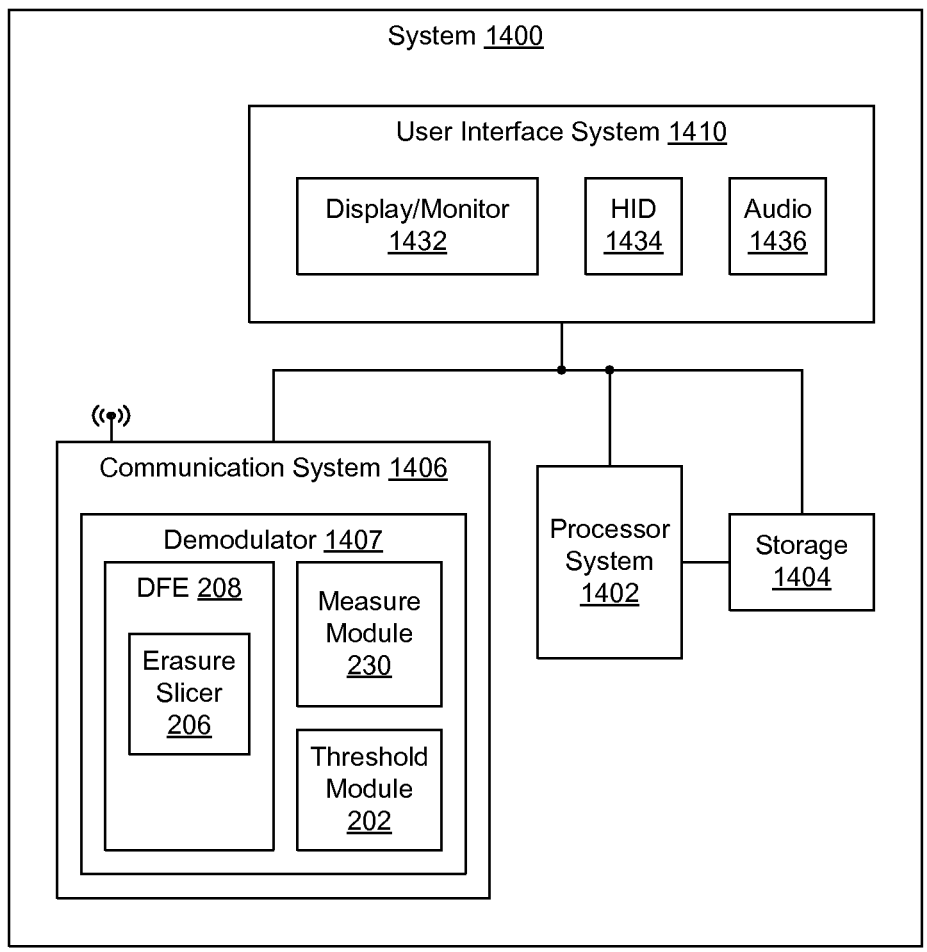
FIG. 14 is a block diagram of a system that includes a processor system, memory or storage, a user interface system, and a communication system, which includes an erasure slicer and a threshold module to vary an erasure threshold based on variations in a measure computed from prior soft and/or hard symbol decisions.

FIG. 14 is a block diagram of a system 1400, including a processor system 1402, memory or storage 1404, a user interface system 1410. System 1400 further includes a communication system 1406 to interface amongst a communication network, processor system 1402, and/or user interface system 1410.

The network may include a mobile telephone network (e.g., cellular and/or satellite based), and/or a packet based network, such as Internet protocol based network. Communication system 1406 may be configured to communicate wirelessly with the communication network using a QAM technique.

Communication system 1406 includes a demodulator 1407, illustrated here as including DFE 208, erasure slicer 206, measure module 230, and threshold module 202, described above with reference to FIG. 2.

Storage 1404 may include one or more features described above with respect to FIG. 11, and may be accessible to processor system 1402, communication system 1406, and/or user interface system 1410.

User interface system 1410 may include a monitor or display 1432 and/or a human interface device (HID) 1434. HID 1434 may include, without limitation, a key board, a cursor device, a touch-sensitive device, a motion and/or image sensor, a physical device and/or a virtual device, such as a monitor-displayed virtual keyboard. User interface system 1410 may include an audio system 1436, which may include a microphone and/or a speaker.

System 1400 may correspond to, for example, a computer system and/or a communication device and may include a housing such as, without limitation, a rack-mountable housing, a desk-top housing, a lap-top housing, a notebook housing, a net-book housing, a tablet housing, a telephone housing, a set-top box housing, and/or other conventional housing and/or future-developed housing. Processor system 1402, storage 1404, communication system 1406, and user interface system 1410, or portions thereof, may be positioned within the housing.

System 1400 or portions thereof may be implemented within one or more integrated circuit dies, and may be implemented as a system-on-a-chip (SoC).

As disclosed herein, a method or process may include:
evaluating soft decisions of symbols of a quadrature amplitude modulated (QAM) signal for erasure based on a threshold; and
computing the threshold based on a measure computed from prior symbol decisions and varying the threshold based on variations in the measure.

The method may further include computing the threshold as a running average of the measure over a sliding window of the symbols.

The method may further include computing the threshold based on a signal-to-noise ratio of the symbols.

The method may further include computing the threshold based on a mean squared error between the soft decisions and corresponding hard decisions.

The method may further include computing the threshold with an infinite impulse response filter over a sliding window of the symbols.

The method may further include weighting the measure with a user-configurable weight.

The method may further include:
evaluating the soft decisions with respect to erasures areas that extend from decision boundaries of a QAM constellation by a distance based on the threshold;
estimating a symbol of a soft decision based on proximity of the soft decision to a point in the QAM constellation and outputting the symbol estimate as a decision if the soft decision is not within an erasure area; and
modifying the symbol estimate when the soft decision is within an erasure area and outputting the modified symbol estimate as the decision.

The method may further include:
identifying a coordinate of the soft decision that is within the erasure area; and
replacing a corresponding coordinate of the symbol estimate with a coordinate of a decision boundary of the erasure area.

The method may further include filtering decisions of the erasure slicer, including symbol estimates and modified symbol estimates, in a feedback filter of a decision feedback equalizer.

A method may include one or more combinations of the method features described above.

A system, machine, and/or computer system may be implemented to perform a method as described above.

A machine readable storage medium may be encoded with program code or instructions, when executed, to cause a machine to perform a method as described above.

A system or apparatus may include:
an erasure slicer to evaluate soft decisions of symbols of a quadrature amplitude modulated (QAM) signal for erasure based on a threshold; and
a threshold module to compute the threshold based on a measure computed from prior symbol decisions and to vary the threshold based on variations in the measure.

The threshold module may be configured to compute the threshold as a running average of the measure over a sliding window of the symbols.

The threshold module may be configured to compute the threshold based on a signal-to-noise ratio of the symbols.

The threshold module may be configured to compute the threshold based on a mean squared error between the soft decisions and corresponding hard decisions.

The threshold module may include an infinite impulse response filter to compute the threshold over a sliding window of the symbols.

The system or apparatus may include a weighting module to weight the measure with a user-configurable weight.

The erasure slicer may be configured to:
evaluate the soft decisions with respect to erasures areas that extend from decision boundaries of a QAM constellation by a distance based on the threshold;
estimate a symbol of a soft decision based on proximity of the soft decision to a point in the QAM constellation and output the symbol estimate as a decision if the soft decision is not within an erasure area; and
modify the symbol estimate when the soft decision is within an erasure area and output the modified symbol estimate as the decision.

The erasure slicer may be further configured to:
identify a coordinate of the soft decision that is within the erasure area; and
replace a corresponding coordinate of the symbol estimate with a coordinate of a decision boundary of the erasure area.

The system or apparatus may include a decision feedback equalizer having a feedback filter to filter decisions of the erasure slicer, including symbol estimates and modified symbol estimates.

A non-transitory computer readable medium may be encoded with a computer program, including instructions to cause a processor to:
evaluate soft decisions of symbols of a quadrature amplitude modulated (QAM) signal for erasure based on a threshold; and
compute the threshold based on a measure computed from prior symbol decisions, and vary the threshold based on variations in the measure.

The computer readable medium may further include instructions to cause the processor to compute the threshold as a running average of the measure over a sliding window of the symbols.

The computer readable medium may further include instructions to cause the processor to compute the threshold based on a signal-to-noise ratio of the symbols.

The computer readable medium may further include instructions to cause the processor to compute the threshold based on a mean squared error (MSE) between the soft decisions and corresponding hard decisions.

The computer readable medium may further include instructions to cause the processor to compute the threshold with an infinite impulse response filter over a sliding window of the symbols.

The computer readable medium may further include instructions to cause the processor weight the measure with a user-configurable weight.

The computer readable medium may further include instructions to cause the processor to:
evaluate the soft decisions with respect to erasures areas that extend from decision boundaries of a QAM constellation by a distance based on the threshold;
estimate a symbol of a soft decision based on proximity of the soft decision to a point in the QAM constellation and output the symbol estimate as a decision if the soft decision is not within an erasure area; and
modify the symbol estimate when the soft decision is within an erasure area and output the modified symbol estimate as the decision.

The computer readable medium may further include instructions to cause the processor to:
identify a coordinate of the soft decision that is within the erasure area; and
replace a corresponding coordinate of the symbol estimate with a coordinate of a decision boundary of the erasure area.

The computer readable medium may further include instructions to cause the processor to filter decisions of the erasure slicer, including symbol estimates and modified symbol estimates, in a feedback filter of a decision feedback equalizer.

A system may include:
a processor system and memory;
a user interface system; and
a communication system to interface between a wireless access point of a communication network and one or more of the processor and the user interface system, wherein the communication system includes a demodulator.

The demodulator may include:
an erasure slicer to evaluate soft decisions of symbols of a quadrature amplitude modulated (QAM) signal for erasure based on a threshold, and to provide decisions to a feedback filter of a decision feedback equalizer (DFE), and
a threshold module to compute the threshold based on a measure computed from prior symbol decisions and to vary the threshold based on variations in the measure.

The threshold module may be configured to compute the threshold based on a mean squared error (MSE) between the soft decisions and corresponding hard decisions.

The erasure slicer may be configured to:
evaluate the soft decisions with respect to erasures areas that extend from decision boundaries of the QAM constellation by a distance based on the threshold;
estimate a symbol of a soft decision based on proximity of the soft decision to a point in the QAM constellation and output the symbol estimate as a decision if the soft decision is not within an erasure area; and modify the symbol estimate when the soft decision is within an erasure area and output the modified symbol estimate as the decision.

The erasure slicer may be further configured to:

identify a coordinate of the soft decision that is within the erasure area; and replace a corresponding coordinate of the symbol estimate with a coordinate of a decision boundary of the erasure area.

The system may include a housing, and may be implemented as a portable communication device, such as described further above.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. An apparatus, comprising:
   a soft decision system to determine soft decisions for symbols of a signal as coordinates within a quadrature amplitude modulated (QAM) constellation;
   a hard decision system to determine hard decisions for the symbols as points within the QAM constellation based on the soft decisions;
   an erasure slicer to evaluate the soft decisions based on a threshold distance, including to determine if a coordinate of a soft decision falls within the threshold distance of a boundary between points of the QAM constellation; and
   a threshold module to vary the threshold distance based on variations in a difference between the soft decisions and the hard decisions;
   wherein the soft decision system is configured to determine the soft decisions based on samples of the QAM signal and an output of the erasure slicer.

2. The apparatus of claim 1, wherein the threshold module is configured to maintain an average of the difference between the soft decisions and the hard decisions over a sliding window of symbols of the signal, and vary the threshold distance based on variations in the average.

3. The apparatus of claim 1, wherein the threshold module is configured to determine the difference between the soft decisions and the hard decisions as a signal-to-noise ratio between the soft decisions and the hard decisions, and vary the threshold distance based on variations in the signal-to-noise ratio.

4. The apparatus of claim 1, wherein the threshold module is configured to vary the threshold distance based on a mean squared error between the soft decisions and the hard decisions, and vary the threshold distance based on variations in the mean squared error.

5. The apparatus of claim 1, wherein the threshold module is configured to:
   weight the difference between the soft decisions and the hard decisions for each symbol within a sliding window of symbols of the signal based on a weighting factor;
   maintain an average of the weighted differences over the sliding window of symbols; and
   vary the threshold distance based on variations in the average;
   wherein the threshold module is configurable with respect to the weight factor to vary a sensitivity of the threshold distance relative to a frequency of variations in the difference between the soft decisions and the hard decisions.

6. The apparatus of claim 1, wherein the threshold module is configured to:
   maintain an average of the difference between the soft decisions and the hard decisions over a sliding window of symbols of the signal; and
   compute the threshold distance as 1 minus the average.

7. The apparatus of claim 1, wherein the erasure slicer is configured to modify the coordinate of the soft decision if the soft decision falls within the variable threshold distance of the boundary.

8. The apparatus of claim 7, wherein the erasure slicer is further configured to change the coordinate of the soft decision to the boundary between the points of the QAM constellation if the soft decision falls within the variable threshold distance of the boundary.

9. A non-transitory computer readable medium encoded with a computer program, including instructions to cause a processor to:
   determine soft decisions for symbols of a signal as coordinates within a quadrature amplitude modulated (QAM) constellation;
   determine hard decisions for the symbols as points within the QAM constellation based on the soft decisions;
   evaluate the soft decisions based on a threshold distance, including to determine if a coordinate of a soft decision falls within the threshold distance of a boundary between points of a QAM constellation;
   vary the threshold distance based on variations in a difference between the soft decisions and the hard decisions; and
   determine the soft decisions based on samples of the QAM signal and results of the evaluation of the soft decisions.

10. The computer readable medium of claim 9, further including instructions to cause the processor to maintain an average of the difference between the soft decisions and the hard decisions over a sliding window of the symbols of signal, and vary the threshold distance based on variations in the average.

11. The computer readable medium of claim 9, further including instructions to cause the processor to determine the difference between the soft decisions and the hard decisions as a signal-to-noise ratio between the soft decisions and the hard decisions of the symbols, and vary the threshold distance based on variations in the signal-to-noise ratio.

12. The computer readable medium of claim 9, further including instructions to cause the processor to vary the threshold distance based on a mean squared error between the soft decisions and the hard decisions, and vary the threshold distance based on variations in the mean squared error.

13. The computer readable medium of claim 9, further including instructions to cause the processor to;
   weight the difference between the soft decisions and the hard decisions for each symbol within a sliding window of symbols of the signal based on a weighting factor;
   maintain an average of the weighted differences over the sliding window of symbols;
   vary the threshold distance based on variations in the average; and
   adjust the weight factor to vary a sensitivity of the threshold distance relative to a frequency of variations in the difference between the soft decisions and the hard decisions.

14. The computer readable medium of claim 9, further including instructions to cause the processor to;
maintain an average of the difference between the soft decisions and the hard decisions over a sliding window of symbols of the signal; and
compute the threshold distance as 1 minus the average.

15. The computer readable medium of claim 9, further including instructions to cause the processor to modify the coordinate of the soft decision if the soft decision falls within the variable threshold distance of the boundary.

16. The computer readable medium of claim 15, further including instructions to cause the processor to change the coordinate of the soft decision to the boundary between the points of the QAM constellation if the soft decision falls within the variable threshold distance of the boundary.

17. A method, comprising:
determining soft decisions for symbols of a signal as coordinates within a quadrature amplitude modulated (QAM) constellation;
determining hard decisions for the symbols as points within the QAM constellation based on the soft decisions;
evaluating the soft decisions based on a threshold distance, including determining if a coordinate of a soft decision falls within the threshold distance of a boundary between points of a QAM constellation; and
varying the threshold distance based on variations in a difference between the soft decisions and the hard decisions
wherein the determining soft decisions includes determining the soft decisions based on samples of the QAM signal and results of the evaluation of the soft decisions.

18. The method of claim 17, wherein the varying the threshold distance includes maintaining an average of the difference between the soft decisions and the hard decisions, and varying the threshold distance based on variations in the average.

19. The method of claim 17, wherein the varying the threshold distance includes determining the difference between the soft decisions and the hard decisions as a signal-to-noise ratio of the symbols, and varying the threshold distance based on variations in the signal-to-noise ratio.

20. The method of claim 17, wherein the varying the threshold distance includes varying the threshold distance based on a mean squared error between the soft decisions and corresponding hard decisions, and varying the threshold distance based on variations in the mean squared error.

21. The method of claim 17, wherein the varying the threshold distance includes:
weighting the difference between the soft decisions and the hard decisions for each symbol within a sliding window of symbols of the signal based on a weighting factor;
maintaining an average of the weighted differences over the sliding window of symbols;
varying the threshold distance based on variations in the average; and
adjusting the weight factor to vary a sensitivity of the threshold distance relative to a frequency of variations in the difference between the soft decisions and the hard decisions.

22. The method of claim 17, wherein the varying the threshold distance includes:
maintaining an average of the difference between the soft decisions and the hard decisions over a sliding window of symbols of the signal; and
computing the threshold distance as 1 minus the average.

23. The method of claim 17, further including modifying the coordinate of the soft decision if the soft decision falls within the variable threshold distance of the boundary.

24. The method of claim 23, wherein the modifying includes changing the coordinate of the soft decision to the boundary between the points of the QAM constellation if the soft decision falls within the variable threshold distance of the boundary.

25. A system, comprising a processor and memory, a user interface system, and a communication system to interface between a communication network and one or more of the processor and the user interface system, wherein the communication system includes:
a soft decision system to determine soft decisions for symbols of a received signal as coordinates within a quadrature amplitude modulated (QAM) constellation;
a hard decision system to determine hard decisions for the symbols as points within the QAM constellation based on the soft decisions;
an erasure slicer to evaluate the soft decisions based on a threshold distance, including to determine if a coordinate of a soft decision falls within the threshold distance of a boundary between points of the QAM constellation and
a threshold module to vary the threshold distance based on variations in a difference between the soft decisions and the hard decisions;
wherein the soft decision system is configured to determine the soft decisions based on samples of the QAM signal and an output of the erasure slicer.

26. The system of claim 25, wherein the threshold module is configured to vary the threshold distance based on a mean squared error (MSE) between the soft decisions and corresponding hard decisions, and vary the threshold distance based on variations in the mean squared error.

27. The system of claim 25, wherein the erasure slicer is configured to modify the coordinate of the soft decision if the soft decision falls within the variable threshold distance of the boundary.

28. The system of claim 27, wherein the erasure slicer is further configured to change the coordinate of the soft decision to the boundary between the points of the QAM constellation if the soft decision falls within the variable threshold distance of the boundary.

* * * * *